United States Patent [19]

Fritzenwenger

[11] 4,388,979
[45] Jun. 21, 1983

[54] MOTORCYCLE POWER TRAIN ARRANGEMENT

[75] Inventor: Josef Fritzenwenger, Anzing, Fed. Rep. of Germany

[73] Assignee: Bayerische Motoren Werke Aktiengesellschaft, Munich, Fed. Rep. of Germany

[21] Appl. No.: 243,950

[22] PCT Filed: Jan. 28, 1980

[86] PCT No.: PCT/EP80/00005
§ 371 Date: Oct. 1, 1980
§ 102(e) Date: Oct. 1, 1980

[87] PCT Pub. No.: WO80/01555
PCT Pub. Date: Aug. 7, 1980

[30] Foreign Application Priority Data

Feb. 1, 1979 [DE] Fed. Rep. of Germany ....... 2903742

[51] Int. Cl.³ .............................................. B62K 11/04
[52] U.S. Cl. ..................................... 180/226; 180/229
[58] Field of Search ................. 180/219, 226, 229, 230

[56] References Cited

U.S. PATENT DOCUMENTS 4,011,921 3/1977 Sakamoto et al. ................... 180/229
4,237,996 12/1980 Matsuda et al. ..................... 180/229

FOREIGN PATENT DOCUMENTS 21417 7/1956 Fed. Rep. of Germany ...... 180/226
517052 2/1955 Italy ..................................... 180/226

Primary Examiner—David M. Mitchell
Assistant Examiner—Ross Weaver
Attorney, Agent, or Firm—Craig & Burns

[57] ABSTRACT

A motorcycle power train arrangement is disclosed which comprises a liquid cooled engine block and a transmission case, substantially exposed and mounted symmetrically to the longitudinal median plane of the motorcycle, largely filling the space between the front wheel and the rear wheel, and including a liquid coolant radiator mounted in substantially vertical position transversely to the direction of travel, a plurality of parallel cylinders being arranged transversely and a crankshaft longitudinally to the direction of travel, the transmission case being located under and/or behind the engine block, and a valve chamber cover forming a symmetrical outer longitudinal limit of the power train; characterized in that the cylinders are located on one side of the engine block in a single line; in that the crankshaft is located on the other side of the engine block and is spaced from and parallel to the longitudinal median plane; and in that covers for the valve chamber and a crank space form on both sides symmetrical outer longitudinal limits of the power train.

4 Claims, 2 Drawing Figures

MOTORCYCLE POWER TRAIN ARRANGEMENT

BACKGROUND AND SUMMARY OF THE INVENTION

The present invention relates to a motorcycle power train arrangement comprising a liquid cooled engine block and a transmission case, substantially exposed and mounted symmetrically to the longitudinal median plane of the motorcycle, largely filling the space between the front wheel and the rear wheel, and including a liquid coolant radiator mounted in substantially vertical position transversely to the direction of travel, a plurality of parallel cylinders being arranged transversely and a crankshaft longitudinally to the direction of travel, the transmission case being located under and/or behind the engine block, and a valve chamber cover forming a symmetrical outer longitudinal limit of the power train.

In a power train of this structure described in German patent application (Auslegeschrift) No. 2,538,172 the cylinders are arranged transversely in horizontally opposed pairs on both sides of the crankshaft which extends in the longitudinal median plane because, due to the wide lateral extension of the cylinders, the power train length is rearwardly limited by the space necessary for the driver's legs. In addition the double arrangement of cylinders, cylinder head, and intake and exhaust systems is disadvantageous in respect to structural complication and weight. It is also difficult to muffle the noise.

The object of the present invention is to provide a motorcycle power train in which these disadvantages are eliminated with a compact power train arrangement of efficient overall structure, including accessory elements, while retaining a low center of gravity. It is also intended to provide as much as possible for a flat and symmetrical configuration, low noise, and favorable conditions for the disposition of a compact exhaust gas treatment system near the exhaust line outlet from the cylinder head. The proposed object is achieved by providing that the cylinders are located on one side of the engine block in a single line; that the crankshaft is located on the other side of the engine block and is spaced from and parallel to the longitudinal median plane; and that covers for the valve chamber and a crank space form on both sides the symmetrical outer longitudinal limits of the power train. In the disclosed embodiment of the invention the covers themselves are substantially symmetrical. According to further features of the disclosed preferred embodiment of the present invention a portion of an exhaust system, on one side, and of a crankcase, on the other side, are adjacent to the covers, but less wide and substantially symmetrical. In addition, the liquid coolant radiator extends from the upper front edge of the engine block and substantially along the entire width of the power train.

Motorscooter and automobile power train arrangements of similar structure with horizontal cylinders are known from German patent Nos. 956,384 and 1,106,627 and German patent application (Offenlegungsschrift) No. 1,962,539. However the developments disclosed in German patent Nos. 956,384 and 1,106,627 provide for the short power train arrangement normal in motorscooters to permit free mounting between the front wheel and the covered air cooled power train, which is made possible by a transverse V belt drive or gearing located near the rear wheel. The structure disclosed in German patent application No. 1,962,539 is designed exclusively to propel automobiles and, in contrast to the invention, comprises a crankshaft extending perpendicularly to the direction of travel. All these structures are designed for installation in a casing, and are therefore of irregular shape and present gaps. Consequently the development of the invention and the application of these power train arrangements to motorcycles with exposed power train are not anticipated in these publications regardless of the existing demand. This is apparent also since these structures have been known for many years.

One embodiment of the invention is illustrated in the drawing.

DETAILED DESCRIPTION OF THE DRAWING

Figure 1:
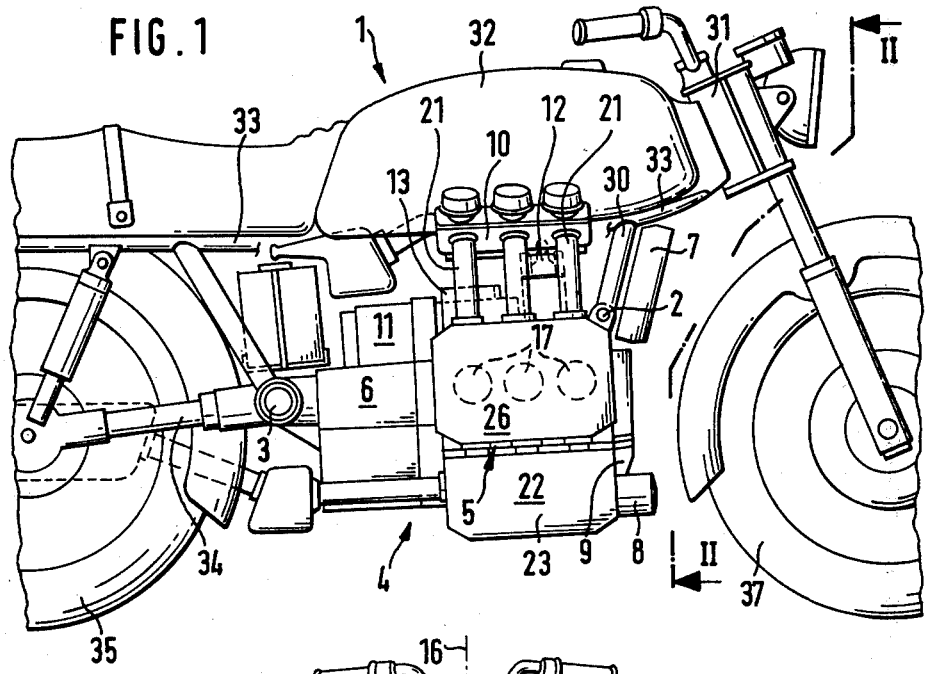
FIG. 1 is a side view of a motorcycle power train arrangement of the invention.

As illustrated in FIG. 1, a motorcycle 1 carries a power train 4 fixed at points 2 and 3. Power train 4 consists substantially of an engine block 5, a transmission 6 attached thereto by a flanged joint, a liquid coolant radiator 7 fixed at an angle forward of and above the front edge of engine block 5, and accessory elements such as an oil filter 8, a coolant pump 9, an intake system 10, a magneto 11, an ignition system 12, and a starter 13, all mounted at the front (8 and 9) or on the top (10-13) of engine block 5.

Figure 2:
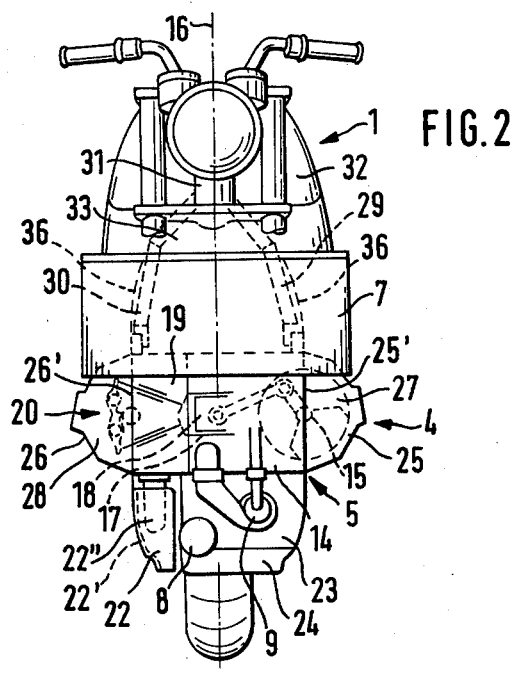
FIG. 2 is a front view along line II—II in FIG. 1.

As shown in FIG. 2, the top portion of engine block 5 comprises a cylinder block-crankcase 14 in which a crankshaft 15 is laterally mounted parallel to the longitudinal median plane 16 of motorcycle 1, and three liquid cooled cylinders 17 provided with pistons 18 driven by crankshaft 15 and extending horizontally at a right angle to longitudinal median axis 16. Engine block 5 also comprises a liquid cooled cylinder head 19 containing a valve mechanism 20 which operates power train 4 as a four stroke cycle system. Cylinder head 19 is connected at the top to intake system 10 by suction lines 21 and at the bottom to an exhaust system 22. At the bottom of crankcase 14 engine block 5 carries a case portion 23 with a bottom cover in the form of an oil pan 24. Beside the oil sump said case portion 23 contains mechanical elements (not shown) such as a load compensation shaft rotating at the same speed as crankshaft 15, but in the opposite direction, the shaft of coolant pump 9, driven by said compensation shaft, and an interior lubricating oil pump (also not shown).

The outer lateral surfaces of exhaust system 22 and case portion 23 are designed to provide on both sides an extremely uniform external configuration of power train 4. For the same purpose engine block 5 is provided on both sides with covers 25 and 26 fixed by flanged joints to enclose the crank space 27 in cylinder block-crankcase 14 and the valve chamber 28 in cylinder head 19 with highly identical or symmetrical outer shape. The flange surfaces 25' and 26' of engine block 5 adapted to covers 25 and 26, are arranged at the same distance, parallel to the longitudinal median plane 16 of motorcycle 1 by suitable determination of the arrangement of cylinder block-crankcase 14 relative to said plane 16.

Above engine block 5, forward of its upper front edge, liquid coolant radiator 7 extends from frame tubes 29 and 30 attached to connection point 2, and is fixed to said tubes 29 and 30 and optionally to the upper front edge of engine block 5. The steering head 31, tank 32, and frame tube 33 extending rearward from steering head 31 are located above liquid coolant radiator 7 and the upper accessory elements 10-13 of power train 4. A flexible shaft 34 driving the rear wheel 35 is connected to transmission 6.

To provide for the satisfactory road behavior of motorcycle 1 the described power train has a low center of gravity, relatively little width, and a highly symmetrical and flat outer configuration notwithstanding the arrangement asymmetrical to longitudinal median axis 16 of longitudinal crankshaft 15. This results from the identical outer shape of covers 25 and 26 on both sides, and of the underlying elements: case portion 23 and exhaust system 22. For the same purpose the outer shape of exhaust system 22 can exhibit a different structure, especially by the provision of a cover plate 22' mounted forward of an otherwise exposed exhaust pipe bend 22".

Accessory elements 8, 9 and 10-13 mounted forward of and above engine block 5 interfere little with the flat outer configuration and, as well as the valve mechanism and the crank drive, are easily accessible after removal of side covers 25 and 26 for setting or maintenance.

Finally the compact overall structure of power train 4, in combination with the cooling jacket spaces for the liquid cooling of cylinders 17 and cylinder head 19, the arrangement of exhaust system 22 close to cylinder head 19, and the advantageous arrangement of intake system 10, provide for low power train noise. The placement of exhaust system 22 in close proximity to cylinder head 19 also improves the operation thereof when a thermal and/or catalytic exhaust gas treatment system is provided.

The outer configuration of power train 4 can be further improved by the addition of air guide surfaces 36 forward of and on both sides of accessory elements 10-13 mounted on engine block 5. Said cool air guide surfaces 36 may be mounted for easy removal to avoid interference with the accessibility of said accessory elements. These guide surfaces 36 also protect the accessory elements from the hot air flowing out of radiator 7. For separate cooling fresh air can be guided to said elements under radiator 7 and through cool air guide surfaces 36.

With the arrangement of power train 4 according to the invention, because of the placement of engine block 5 in the immediate vicinity of the space required by the front wheel 37 of motorcycle 1, 4-6 cylinder engines with normal cylinder capacity can be used instead of the 3-cylinder engine and shorter 2-cylinder engine selected in the embodiment without adverse effects on the total length of motorcycle 1.

I claim:

1. A motorcycle power train arrangement comprising a liquid cooled engine block and a transmission case, substantially exposed and mounted symmetrically to the longitudinal median plane of the motorcycle, largely filling the space between the front wheel and the rear wheel, and including a liquid coolant radiator mounted essentially above the engine block in substantially vertical position transversely to the direction of travel, a plurality of parallel cylinders being arranged transversely and a crankshaft longitudinally to the direction of travel, the transmission case being located adjacent the engine block, and a valve chamber cover forming to one side an outer longitudinal limit of the power train, a crank space cover forming an outer longitudinal limit of the power train on the other side; and wherein the cylinders are located on said one side of engine block in a single line; the crankshaft is located on said other side of the engine block and is spaced from and parallel to the longitudinal median plane, and in that said covers for the valve chamber and crank space form on both sides symmetrical outer longitudinal limits of the power train; a portion of an exhaust system on said one side, and of a crankcase on said other side, are below and adjacent to said covers, but less wide and substantially symmetrical.

2. The power train arrangement as in claim 1, characterized in that the covers are substantially symmetrical.

3. The power train arrangement as in claim 1, characterized in that the liquid coolant radiator extends from the upper front edge of the engine block and substantially along the entire width of the power train.

4. The power train arrangement as in claim 3, characterized in that frame tubes extend upward at an angle from the upper front edge of the engine block to the steering head of the motorcycle; and in that the liquid coolant radiator extends forward and on both sides of said frame tubes.

* * * * *